W. H. PUGH.
Subterranean Irrigation.

No. 142,413. Patented September 2, 1873.

Witnesses.

Inventor.

UNITED STATES PATENT OFFICE.

WILLIAM H. PUGH, OF CHICAGO, ILLINOIS.

IMPROVEMENT IN SUBTERRANEAN IRRIGATION.

Specification forming part of Letters Patent No. 142,413, dated September 2, 1873; application filed January 9, 1873.

*To all whom it may concern:*

Be it known that I, WILLIAM H. PUGH, of the city of Chicago, in the county of Cook and State of Illinois, have invented certain new and useful Improvements in the Culture of Plants and Trees, of any and all kinds—my invention might appropriately be called an underground irrigator—and I do hereby declare the following to be a full, clear, and exact description thereof, reference being had to the accompanying drawings forming part of this specification, which will enable those skilled in the art to which my invention appertains to make and use the same.

Figure 1:
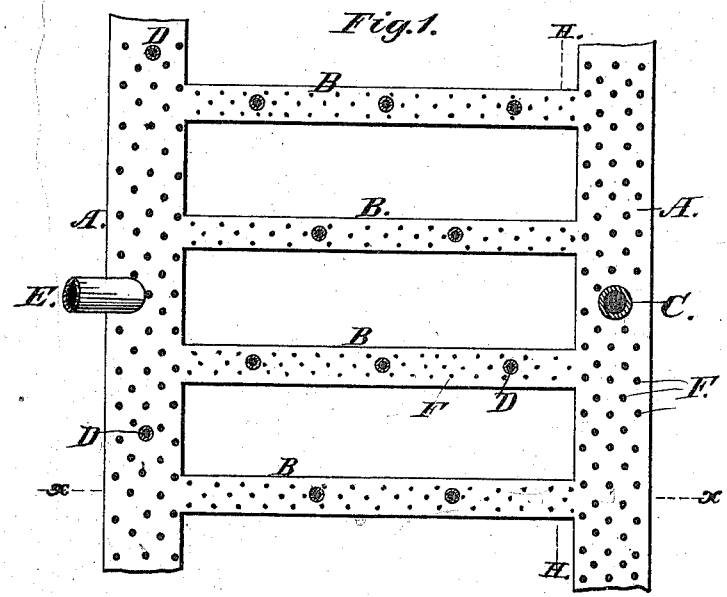
Figure 2:
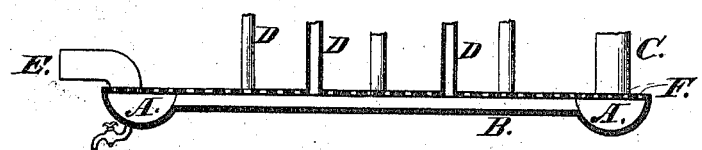
Figure 3:
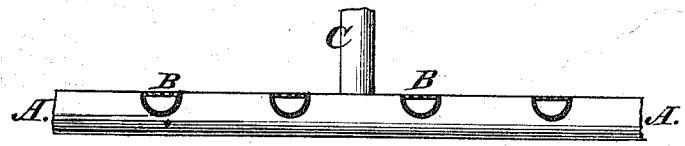

Figure 1 is a top view of my invention. Fig. 2 is a vertical section cut lengthwise through the line X X in Fig. 1. Fig. 3 is a vertical section of my invention cut lengthwise through the line H H in Fig. 1.

My invention consists in a partially perforated or porous tile, tube, or pipe, or a series of the same, made of any material desired, and of any size, shape, or thickness desired, as and for the purpose hereinafter described. This series is so connected that water admitted into one tile, tube, or pipe will pass into and through all of them, irrigating the land through the perforations or pores F F in its passage through the series, any surplus at any time being drained off at the end of the series.

In the drawing, in Fig. 1, A A show large tiles, tubes, or pipes, into which open other lateral tiles, tubes, or pipes, as shown, in this case, at B B B B. The bottom and sides of these pipes may, if desired, be made impervious entirely up to the top, with perforations or porosity on the top sides only, if so desired; or the sides may be impervious a part of the way only up from the bottom. These pipes are, if desired, supplied with dew-tubes, opening into them vertically from above the ground, as shown at D D in Figs. 1 and 2.

Water, air, steam, vapor, gas of any kind, liquid fertilizers, or any liquid or fluid, gaseous or vaporous substances, poured or admitted into A at C C, in Figs. 1 and 2, will pass through the entire series of perforated or porous tiles, tubes, or pipes, and, through the perforations or porosity F F, supply warmth, moisture, and fertilization to the earth and plants.

The plan of this invention is this: The pipe or series of pipes described are placed on or below the surface of the ground, and then straw, moss, or grass, or any substance that will prevent the perforations from filling up, placed on the same, and then the plant or tree is planted above or at the side of the pipe.

The tubes D D D D are dew-tubes, one end opening into the perforated tile, and the other end opening in the air above the ground. Water passes out through these tubes in the form of dew, mist, or vapor, and disseminates among the foliage of the plants. E is an orifice or tube, for the escape of any surplus water, steam, &c.

The earth can at any time be warmed through the perforations or pores of the pipes by admitting into the same steam, hot air, or hot water.

In a wet time or season the ground can be drained by the surplus water in the soil running into the pipes through the perforations, and flowing out at the stop-cock T, Fig. 2.

Air can be supplied to the roots of the plants by circulating it through the series of pipes. Any fertilizer may be supplied in the same way.

This series of pipes may be extended over any area of land, from the smallest garden to the largest field or fields.

What I claim as new and as my invention, and wish to secure by Letters Patent, is—

A tile, tube, or pipe, perforated or porous on the upper side, and impervious on the under side, as described in the foregoing specification, or a series of such tiles, tubes, or pipes, said pipes to be made of any material, and of any size, shape, and thickness, and either with or without the dew-tubes D and waste-pipe E, as and for the purpose desired.

WILLIAM H. PUGH.

Witnesses:
LIZZIE PAINE,
FREDERICK J. SEYBOLD.